United States Patent [19]
Stott et al.

[11] Patent Number: 6,137,847
[45] Date of Patent: Oct. 24, 2000

[54] DEMODULATING DIGITAL VIDEO BROADCAST SIGNALS

[75] Inventors: Jonathan Highton Stott, Horley; Justin David Mitchell; Christopher Keith Perry Clarke, both of Crawley; Adrian Paul Robinson; Oliver Paul Haffenden, both of London, all of United Kingdom; Philippe Sadot, Ville d'Avray, France; Lauret Regis, Sonchamp, France; Jean-Marc Guyot, Paris, France

[73] Assignee: LSI Logic Corporation, Milpitas, Calif.

[21] Appl. No.: 09/071,585

[22] Filed: May 1, 1998

Related U.S. Application Data

[60] Provisional application No. 60/054,195, Jul. 30, 1997.

[30] Foreign Application Priority Data

| May 2, 1997 | [GB] | United Kingdom | 9709063 |
| Dec. 22, 1997 | [GB] | United Kingdom | 9727112 |
| Dec. 22, 1997 | [GB] | United Kingdom | 9727113 |
| Apr. 27, 1998 | [GB] | United Kingdom | 9808991 |

[51] Int. Cl.[7] .................................................. H04L 27/06
[52] U.S. Cl. ........................ 375/344; 375/354; 370/480; 370/503; 370/520
[58] Field of Search .................................. 375/316, 344, 375/354, 355, 362, 320, 329, 365; 370/480, 464, 498, 503, 520; 455/192.2, 192.3, 182.2, 182.3

[56] References Cited

U.S. PATENT DOCUMENTS

| 5,151,926 | 9/1992 | Chennakeshu et al. | 375/333 |
| 5,202,901 | 4/1993 | Chennakeshu et al. | 375/331 |
| 5,353,307 | 10/1994 | Lester et al. | 375/233 |
| 6,002,710 | 12/1999 | Hendrickson et al. | 375/140 |
| 6,023,477 | 2/2000 | Dent | 370/509 |

*Primary Examiner*—Stephen Chin
*Assistant Examiner*—Lenny Jiang

[57] ABSTRACT

A demodulator suitable for implementation in a single chip for demodulating digital video broadcast signals including data modulated on a multiplicity of spaced carrier frequencies, wherein an input broadcast signal is converted to a frequency sufficiently low to enable analog digital conversion of the signal. The demodulator includes an analog to digital converter for converting the broadcast signal to a series of digital samples; a real to complex converter for converting each digital sample to a complex number value; Fourier transformer for analyzing the complex number values to provide a series of data symbol values for each carrier frequency; a signal processor for receiving the data symbol values and providing an output for decoding; and a timing synchronizer for synchronizing the Fourier transformer with the symbol periods of the broadcast signal. The synchronizer includes a correlation for receiving the data sample values and including a delay having a time period delay equal to the active symbol period, and a multiplier for receiving the data symbol values and a version thereof delayed by the delay, to form a complex product signal, and a filter for filtering the complex product signal. The timing synchronizer includes a coarse synchronizer employing a subset of the data sample values for providing a course timing synchronization, and a fine synchronizer for providing a fine synchronization within a time period determined by the coarse synchronization.

18 Claims, 11 Drawing Sheets

SUB-SAMPLING IMPLEMENTATION OF THE TIMING SYNCHRONISATION

Fig. 3. OFDM RECEIVER FRONT END

Fig. 4. OFDM SYMBOL COMPRISING ITS ACTIVE AND GUARD INTERVAL AND THEIR RELATIONSHIP

Fig.5. PROPERTIES OF THE CORRELATION PRODUCT WITH TIME

Fig.6. PROPERTIES OF THE PRODUCT XY WITH FREQUENCY ERROR

——— COMPLEX PRODUCT
——— PROJECTED COMPLEX PRODUCT OVER REAL AXIS
——— PROJECTED COMPLEX PRODUCT OVER IMAGINARY AXIS $W_0 T_A$ PHASE DUE TO FREQUENCY OFFSET $W_0$

Fig.9.
SUB-SAMPLING IMPLEMENTATION OF THE TIMING SYNCHRONISATION

Fig. 10.

Fine window in 2K and 8K modes

• FINE SAMPLE
○ COARSE SAMPLES
× UNUSED SAMPLES

8k MODE (1024 COARSE SAMPLES AND 224 FINE SAMPLES)

2k MODE (1024 COARSE SAMPLES AND 128 FINE SAMPLES)

DEMODULATING DIGITAL VIDEO BROADCAST SIGNALS

This application claims priority from U.S. provisional application number 60/054,195, filed Jul. 30, 1997.

This invention relates to demodulating digital video broadcast (DVB) signals.

There are currently two major types of DVB, namely, terrestrial broadcasting and satellite/cable broadcasting. The invention is particularly, though not exclusively concerned with terrestrial broadcasting, which has special problems, particularly in communication channel impairment, arising from adjacent television channels, multipath, and co-channel interference, for example. A type of transmission which has been developed to meet these problems is known as Coded Orthogonal Frequency Division Multiplexing (COFDM)—see for example "Explaining Some of the Magic of COFDM" Stott, J. H.—Proceedings of 20th International Television Symposium, Montreux, June 1997. In COFDM, transmitted data is transmitted over a large number of carrier frequencies (1705 or 6817 for DVB) occupying a bandwidth of several MHz in the UHF spectrum, spaced (by the inverse of the active symbol period) so as to be orthogonal with each other; the data is modulated as QPSK or QAM and convolutionally coded, to enable soft-decision (Viterbi) decoding. Metrics for COFDM include Channel State Information (CSI) which represents the degree of confidence in each carrier for reliably transmitting data.

Modulation and Demodulation of the carriers may be carried out by a Fast Fourier Transform (FFT) algorithm performing Discrete Fourier Transform operations. Naturally, various practical problems arise in demodulation, firstly in translating the transmitted signal to a frequency at which demodulation can be carried out, and secondly by accurately demodulating the data from a large number of carriers in a demodulator which is not overly complex or expensive, which involves inter alia synchronizing the demodulator (receiver) in time to the incoming signal. This is important for the proper execution of the FFT algorithms.

The data signal on each carrier has a relatively long symbol period and this, in part, gives the signal its good performance in conditions of multipath propagation. The multipath performance is further enhanced by the inclusion of a guard interval in which a portion of the modulated signal waveform taken from the end of each symbol is also included at the beginning of the symbol period. Different fractions of the basic symbol period, such as ⅟32, ⅟16, ⅛ or ¼, can be used in this way to provide immunity to multipath distortion of increasingly long delays.

The principal requirement for synchronization in a receiver is to obtain from the signal waveform a reliable time synchronization pulse related to the start of the symbol period. Such a pulse is then be used to start, at the correct position in the waveform, the process of Fourier Transformation which accomplishes a major portion of the demodulation process. A second requirement for synchronization is to lock a digital sampling clock in the receiver to an appropriately chosen harmonic of the symbol period. However, the modulated OFDM waveform produced by adding together all the modulated carriers is essentially noise-like in nature and contains no obvious features such as regular pulses which could be used to synchronize the circuitry receiver. Because of this, techniques for synchronization are based on correlation of the signal with a version of itself delayed by the basic symbol period. The similarity between the portion included to form the guard interval and the final part of the basic symbol is then shown as a region of net correlation while the remainder of the symbol period shows no correlation. Even so, the correlated waveform still reflects the noise-like nature of the signal waveform and can be impaired by signal distortions, so it is necessary to process the signal further to obtain reliable synchronization.

British patent application GB-A-2037155 describes time synchronization involving the use of correlation and a filter which exploits the periodicity of the waveform to form a complex symbol pulse. The modulus of the pulse signal is used to derive a pulse related to the start of the symbol period and a signal to control a sampling clock frequency in the demodulator.

An implementation of such an arrangement in the 8K mode of COFDM would require about 410 K bits of memory, which is far too great for implementation in a single chip.

It is an object of the present invention to provide a demodulator for digital terrestrial video broadcast signals which can demodulate data transmitted by a COFDM system but which may be manufactured simply and inexpensively, preferably in a single integrated circuit chip.

The present invention provides as a first aspect, apparatus for demodulating digital video broadcast signals comprising data modulated on a multiplicity of spaced carrier frequencies, comprising:

conversion means for converting a down-converted version of the broadcast signal to a series of digital samples in complex format, transform means for analyzing the digital sample values to provide a series of data symbol values for each carrier frequency, and signal processing means for receiving the data symbol values and providing an output for decoding, and timing synchronization means for synchronizing the transform means with the symbol periods of the broadcast signal, including correlation means for receiving said digital sample values and comprising delay means having a time period delay equal to the active symbol period, and multiplier means for receiving the digital sample values and a version thereof delayed by said delay means, to form a complex product signal, and means for processing the complex product signal to derive timing synchronization pulses, wherein the timing synchronization means comprises a coarse synchronization means employing a subset of the digital sample signals for providing a coarse timing synchronization, and a fine synchronization means for providing a fine synchronization within a time period determined by the coarse synchronization means.

As will be shown below the timing synchronization means according to the invention can result in the use of only 6 K bits, or 15% of the memory required for the implementation mentioned above.

In accordance with the invention, the timing synchronization means, where a fast Fourier Transform is employed, locks the transform to the start of the symbol period. In addition, a signal is provided for controlling the sampling rate of said conversion means to an harmonic of the broadest signal.

BRIEF DESCRIPTION OF THE DRAWINGS

A preferred embodiment of the invention will now be described with reference to the accompanying drawings, in which.

DESCRIPTION OF THE PREFERRED EMBODIMENTS

The preferred embodiment of the present invention comprises a front end for digital terrestrial television transmitted according to the DVB-T specification. The front end consists of two separate components. First, an analog down-converter that converts the input signal from UHF to a low IF. Second, an integrated circuit chip that accepts the analog signal from the down-converter and performs the required DSP operations, which include synchronization and demodulation, to form a stream of soft decisions suitable for presentation to an FEC decoder (Forward Error Correction decoder).

Full compliance to the DVB-T specification means that the chip is capable of decoding signals transmitted in the following modes:

1) A signal that contains either 1705 or 6817 active carriers, commonly referred to as 2K and 8K respectively. The chip includes the functionality and memory required to perform the FFT algorithm in both modes.
2) Non-hierarchical QPSK, 16-QAM and 64-QAM constellations.
3) Hierarchical 16-QAM and 64-QAM constellations, either uniform or non-uniform with the possible scale factors $\alpha=2$ and $\alpha=4$.
4) Guard intervals ¼, ⅛, 1/16 and 1/32 of the OFDM symbol length.
5) Viterbi code rates ½, ⅔, ¾, ⅚ and ⅞.

Figure 1:
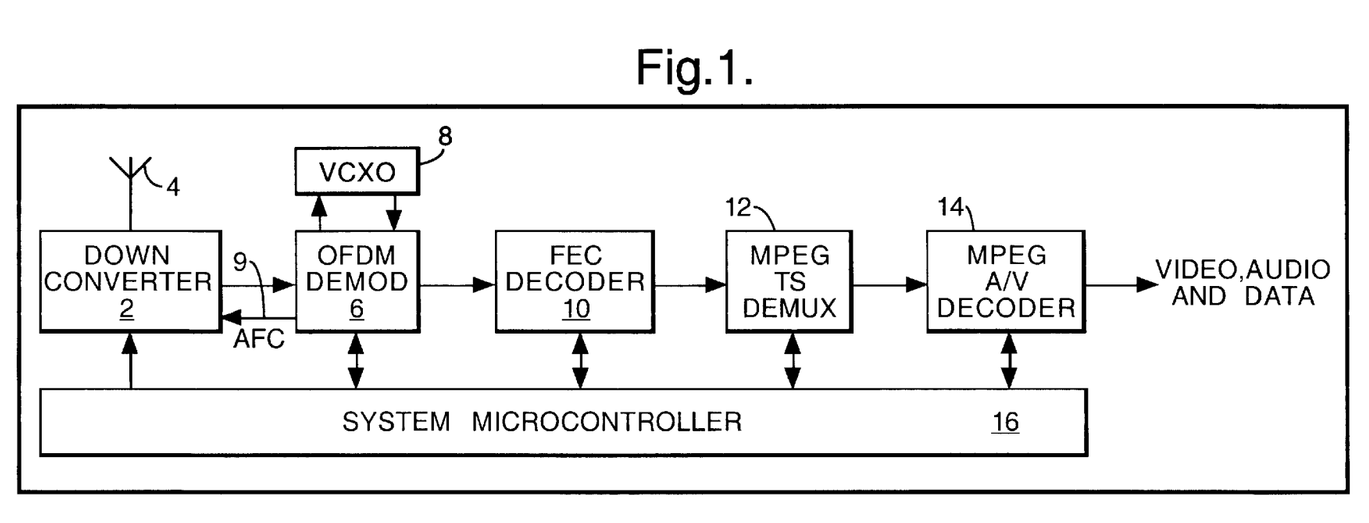
FIG. 1 is a schematic block diagram of a digital terrestrial front end converter incorporating the present invention.

Referring now to FIG. 1, a block diagram of the front end system, a down-converter 2 receives the input UHF broadcast signal from an antenna 4 and converts the carrier signal to a first IF frequency of 30–40 MHz and then to a second IF frequency of 4.57 MHz. Since the bandwidth of the modulated data is about 7.6 MHz, this second IF signal is sufficiently low in frequency to present the signal as a base band signal to a demodulator chip 6. Demodulator chip digitizes the incoming signal at a rate determined by a voltage controlled oscillator 8, and provides an Automatic Frequency Control on a line 9 to down-converter 2. The output of demodulator 6 represents demodulated data and is fed to a FEC decoder 10 (Forward Error Correction or Viterbi decoder) for recovering the data. The decoded data is fed to a transport stream demultiplexer 12 and then to an audio-visual decoder 14. The front end is controlled by a system microcontroller 16.

Figure 2:
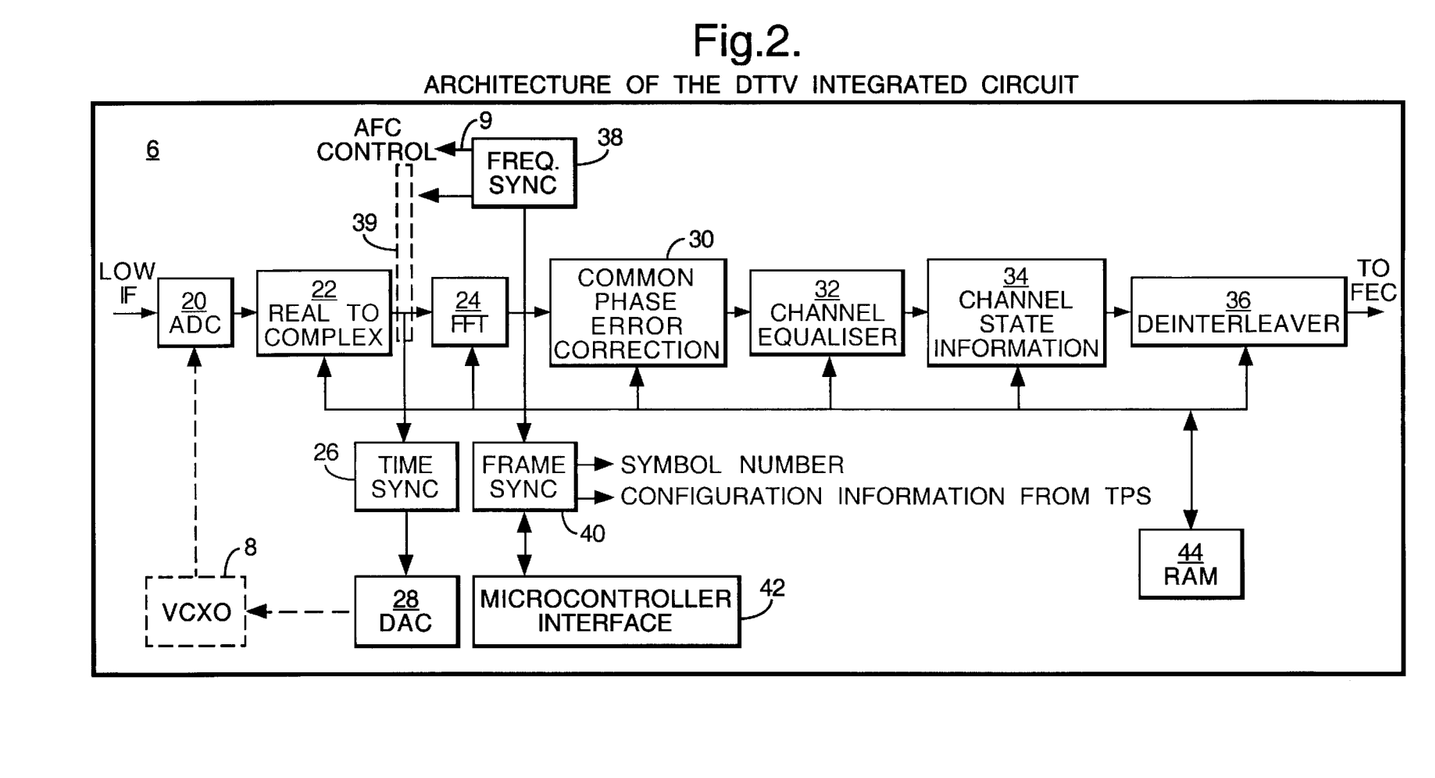
FIG. 2 is a more detailed block diagram of demodulating apparatus according to the invention forming part of the converter of FIG. 1.

Referring now to FIG. 2, this shows the demodulator chip 6 in more detail. The chip itself is shown schematically in FIG. 3. The low second IF is fed to an analog digital converter which samples the IF signal at a frequency of 18.29 MHz (×4 the second IF frequency of 4.57 MHz), in an analog to digital converter 20. The digital output samples are fed to a real to complex converter 22 which converts the digital samples to complex number values in order to provide a complex signal centered on zero frequency. This signal is fed to a Fast Fourier Transform device (FFT) 24 and to a timing synchronization unit 26 which derives a value from the complex input signal which is fed to a digital to analog converter 28 to supply an analog control voltage to a voltage controlled oscillator 8, which provides a sampling clock signal to analog to digital converter 20.

The FFT device 24 has four modes of operation. Firstly, it is capable of performing either a 2048 point or an 8192 point transform. Second, it is capable of performing the transform in either direction. The inverse FFT functionality is provided so that the integrated circuit may be used in applications requiring OFDM modulation. In any event, the FFT performs a series of discrete Fourier transforms on each carrier frequency to provide at an output the data symbols for each carrier frequency. These output signals are corrected in phase at a common phase error generator unit 30 and then passed to a channel equalizer 32, a channel state information unit 34 and a deinterleaver 36. The signal thus processed is then passed at an output from the demodulator to forward error correction unit 10. The phase error correction block 30 calculates the common phase error of the signal and applies the necessary correction. The channel equalizer 32 first performs linear temporal equalization followed by frequency equalization using a high order interpolating filter. The equalizer outputs an equalized constellation to the channel state information unit 34. Unit 34 generates 3 or 4 bit soft decisions which are suitable for presentation to a Viterbi decoder. Deinterleaver 36 performs firstly symbol deinterleaving followed by bit deinterleaving.

In addition, the output signals from FFT 24 are passed to a frequency synchronization unit 38 which converts it to a control signal on line 9 for automatic frequency control, which acts upon a local oscillator in down-converter unit 2 for adjusting the frequency of the first or second IF. As an alternative, unit 38 may control a DDFS unit 39 (indicated in dotted lines) to compensate digitally for the frequency drift by centering the signal around 0 Hz.

In addition, the output of FFT 24 is fed to a frame synchronization unit 40. A microcontroller interface 42 is provided, and in addition RAM memory 44 is provided to which all the units 22, 24, 30–36 have access to in order to provide their required operations.

A significant problem for demodulator integrated circuit 6 is the amount of RAM 42 that the chip requires.

It is necessary to make the best possible use of the RAM. Some of the blocks of memory, such as the FFT and symbol deinterleaver, require fixed amounts of RAM and it is not possible to reduce them (except by reducing the word widths and so degrading the performance). The timing synchronization however is designed for reducing the amount of memory but without degrading the performance.

Timing Synchronization

Figure 3:
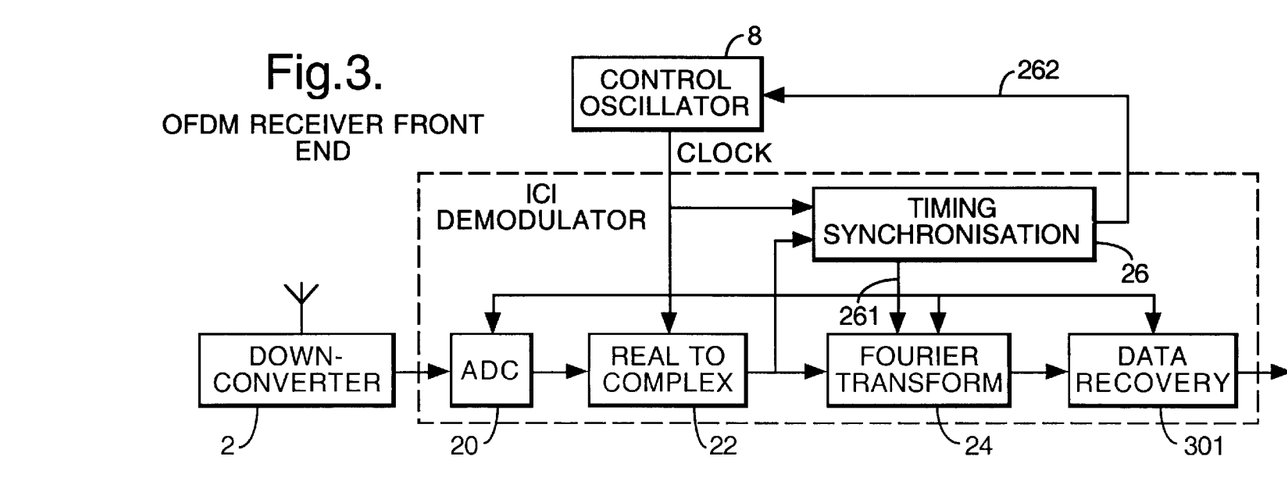
FIG. 3 is a more detailed block diagram of the timing synchronization elements of FIG. 2.

The timing synchronization is indicated in more detail in FIG. 3, wherein similar parts to those of FIG. 2 are denoted by the same reference numerals. It may be seen timing synchronization unit 26 provides a symbol pulse on line 261 to FFT unit 24 to start the Fourier transform, and a sampling frequency error signal on line 262 to oscillator 8. Oscillator 8 provides clock signals principally to ADC 20, and also to real to complex unit 22, FFT 24, timing synchronization unit 26, and other units in the signal processing chain, indicated generally by data recovery unit 301.

Figure 4:
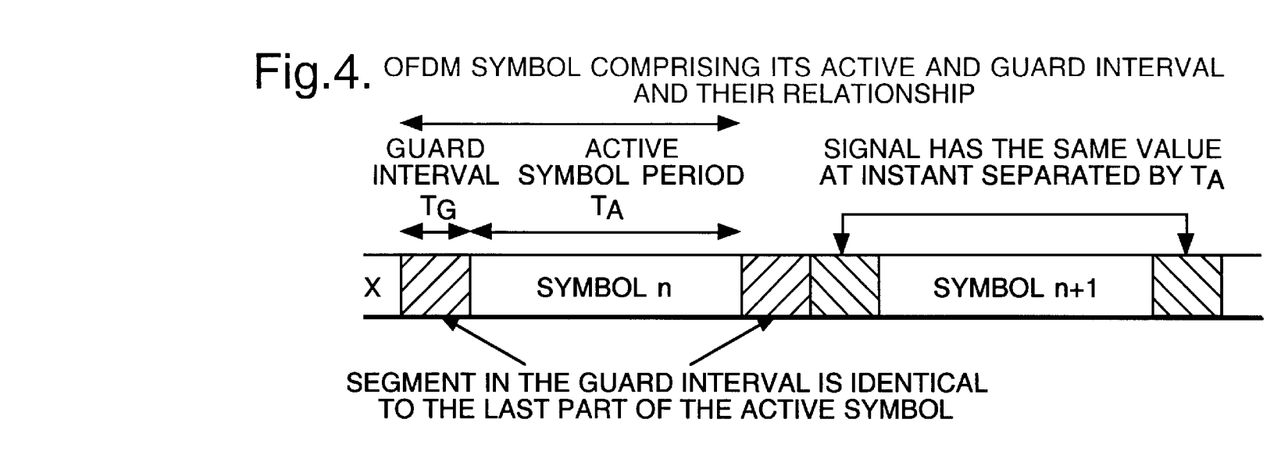
FIG. 4 is a diagram of adjacent OFDM symbols having active and guard intervals.

Coded Orthogonal Frequency Division Multiplexing (COFDM) has been specified for terrestrial television as defined in the DVB-T ETSI specification. The OFDM symbol produced by adding all the modulated carriers is essentially noise like in nature and contains no obvious features such as regular pulse which could be used to synchronize the receiver. The addition of the guard interval is the key to the usefulness of COFDM in multipath environment. It is also the key to the proposed synchronization method. As shown in FIG. 4, each OFDM symbol is extended by a period $T_G$ (or $\Delta$) (the guard interval) which precedes the useful or active symbol period $T_A$, so that the whole symbol now lasts $T_S$ in total. $T_A$ is the reciprocal of the carrier spacing $F_A$, and is the duration of the time domain signal analyzed by the fast Fourier Transform. Each carrier is continuous over the boundary between the guard interval and the active part of the same symbol, keeping the same amplitude and phase. If we consider the signal as complex baseband, with all the carriers not only spaced by $F_A$ but also equal to multiple $F_A$, then the signal in the guard interval is effectively a copy of the segment of the signal occupying the last $T_G$'s worth of the active part. It follows that the signal has the same value at any instant which are separated by $T_A$ but lie within the same symbol.

Figure 5:
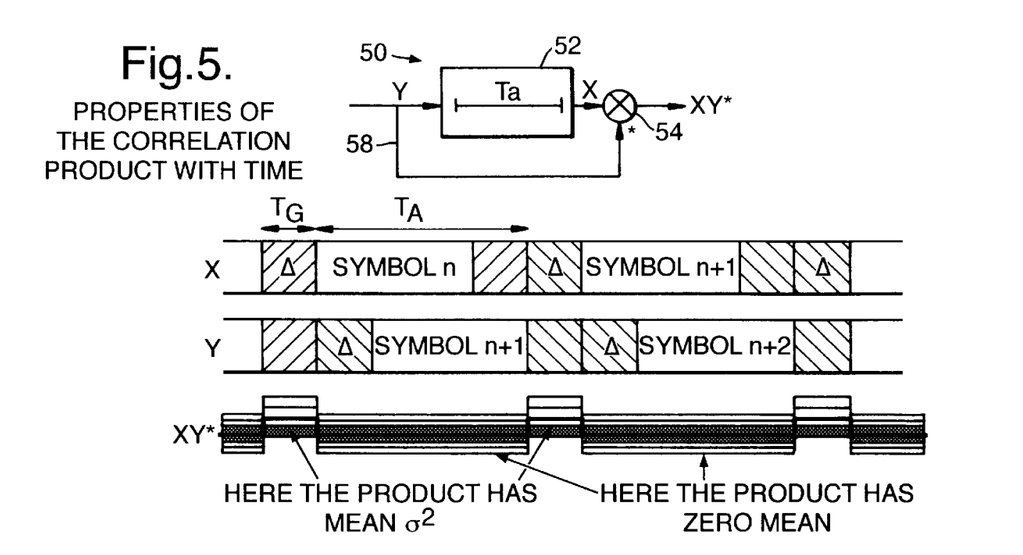
FIG. 5 is a block diagram of a correlator unit for extracting timing information, together with waveform diagrams showing its principle of operation.

The similarity between the portion included to form the guard interval and the final part of the basic symbol is then shown as a region of net correlation while the remainder of the symbol period shows no correlation. Because of this, techniques for timing synchronization are based on correlation of the signal with a version of itself delayed by the active symbol period. A correlator 50 is shown in FIG. 5, comprising a one symbol delay 52 and a feed forward path 58 coupled to respective inputs of a complex multiplier 54.

The correlator takes the complex baseband signal Y, delays it by $T_A$ and multiplies the delayed version X with the complex conjugate of Y to form the product XY*. For those instants where the two samples X and Y belong to the same symbol, then the mean of the product XY* is proportional to $\sigma^2$ (the square of the variance); otherwise, the two samples X, Y being independent, the product XY* has zero mean. Because the output XY* of the complex multiplier is noisy (see FIG. 5), it is necessary to filter to make visible the underlying pulse structure before the slicing process to detect the symbol pulse.

Figure 6:
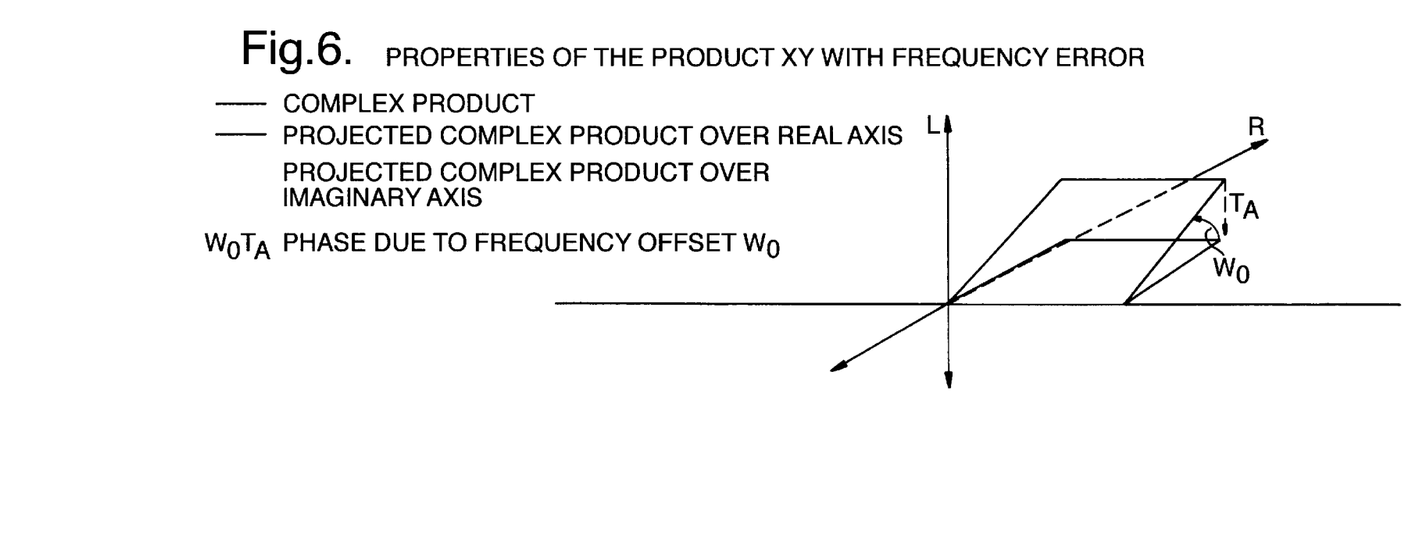
FIG. 6 is a schematic diagram of a complex pulse recovered from the correlator.
Figure 7:
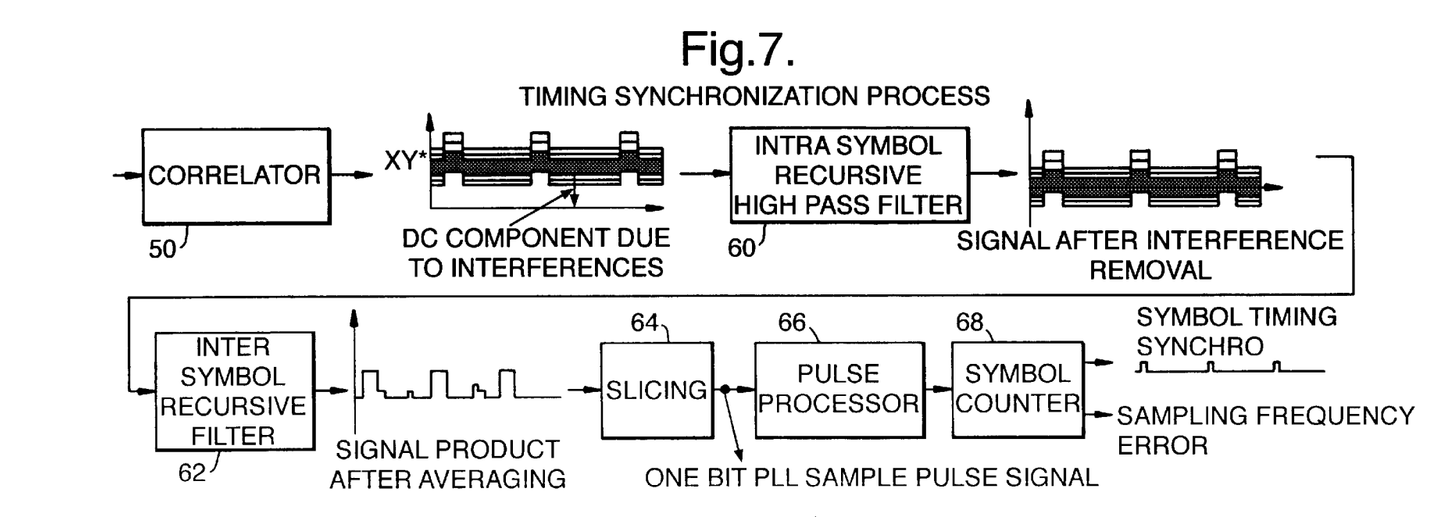
FIG. 7 is a block diagram together with appropriate waveform diagrams of one form of timing synchronization.

An implementation is shown in FIG. 7. Two types of filter are used. The first one, an inter symbol recursive high pass filter 60 is included to remove the arbitrary DC component introduced when an OFDM signal experiences interferences. The second one, an inter symbol recursive filter 62 reduces the noise component by averaging the signal value from one symbol to another. After these two filters, slicer 64 extracts the timing information in a way that it can be used to control the loop governing the sampling frequency and symbol timing. Because the timing synchronization process takes place before frequency control, possible frequency offset caused by tuner error may occur. The complex filtered signal product input to slicer 64 is a complex pulse shape signal, as shown in FIG. 6. This complex filtered signal product is effectively projected over the real and imaginary axes in slicer 64. The magnitudes of the real and imaginary projections are compared and the larger one is chosen. The selected one is then sliced and further processed to check and isolate the leading edge of the pulse.

This sample pulse is then fed to a pulse processor 66 which generates a single pulse at the leading edge of the pulse and prevents the generation of spurious pulses. The timing of pulses produced by the pulse processor 66 is compared with the timing of pulses produced from the sampling clock frequency in a symbol counter 68. The comparison produces an error signal "sampling frequency error" applied to oscillator 8 (FIG. 3).

The correlation function is performed over a full active period of the OFDM symbol; in 8K mode, a full version of the delay line in the correlator would require up to 8192 complex samples store locations (each of 20 bits) leading to a large memory of 163840 bits.

The inter symbol recursive filter performs its averaging over a full symbol period (active+guard interval period). In 8K mode with a guard interval of one quarter of the active period this results to 10240 complex samples per OFDM symbol, each complex samples of 24 bits, 12 bits for both real and imaginary parts, leading to a memory requirement of 245760 bits. Thus, a fall version of the timing algorithm requires about 410K bits of memory.

Some architecture trade-offs and some algorithm alterations in the timing synchronization are necessary for the sole purpose of reducing this huge amount of memory but without degrading the performance.

Figure 8:
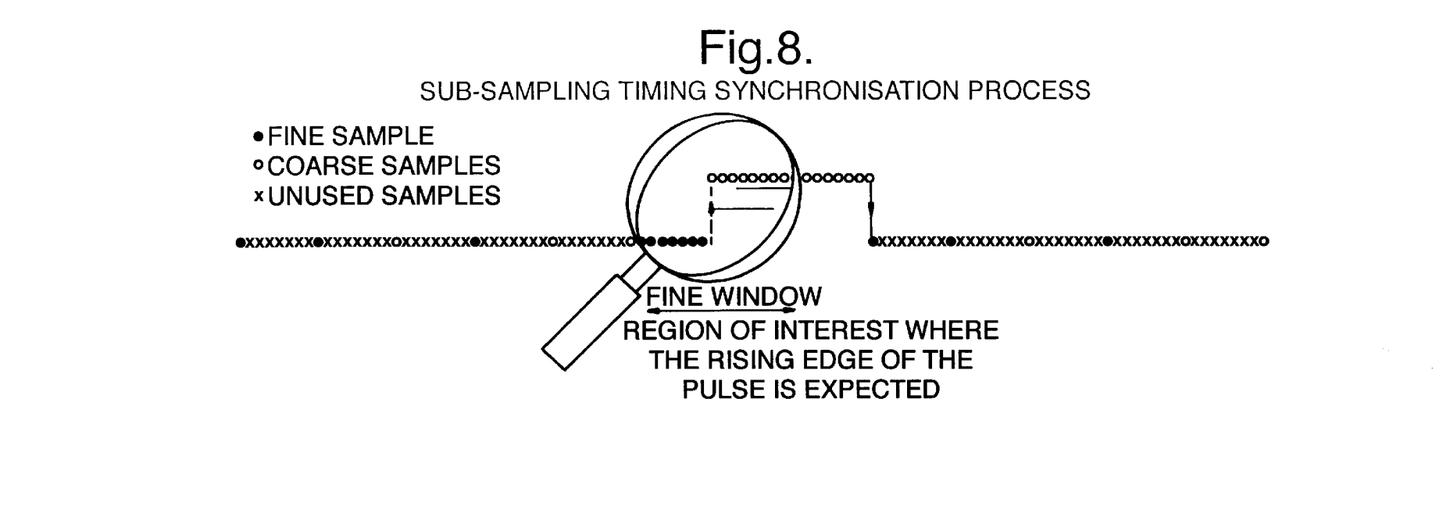
FIG. 8 is a diagram of the principle underlying the present invention.

To reduce dramatically this memory and still keeping the same performance, the timing synchronization in accordance with the invention consists of two processes, a coarse timing synchronization process and a fine timing synchronization process, as illustrated in FIG. 8.

The coarse timing synchronization process realizes a correlation and inter symbol recursive filtering only over a subset of the OFDM signal by sub-sampling in time by a factor of 8 in 8K mode (by a factor of 2 in the 2K mode) the incoming complex samples, resulting in the storage of only 1024 complex samples for the correlator and 1280 complex samples for the inter symbol recursive filter. The coarse timing synchronization process identifies rapidly the region of net correlation where the rising edge of the pulse structure is presumed to be located.

The fine timing synchronization process corresponds to a full resolution of the correlation and the inter symbol recursive filtering but only in the region where the rising edge of the pulse structure is determined by the coarse process. This region called the fine window represents only 1/32 of the complete active period in 8K that is 224 complex sample store locations for the correlator and 224 complex samples for the recursive filtering. The task of fine timing synchronization is to determine more gradually and precisely the phase of the incoming symbol pulse.

Such timing synchronization requires 61056 bits or only 15% of memory which is required for a full resolution version of the timing synchronization.

Figure 9:
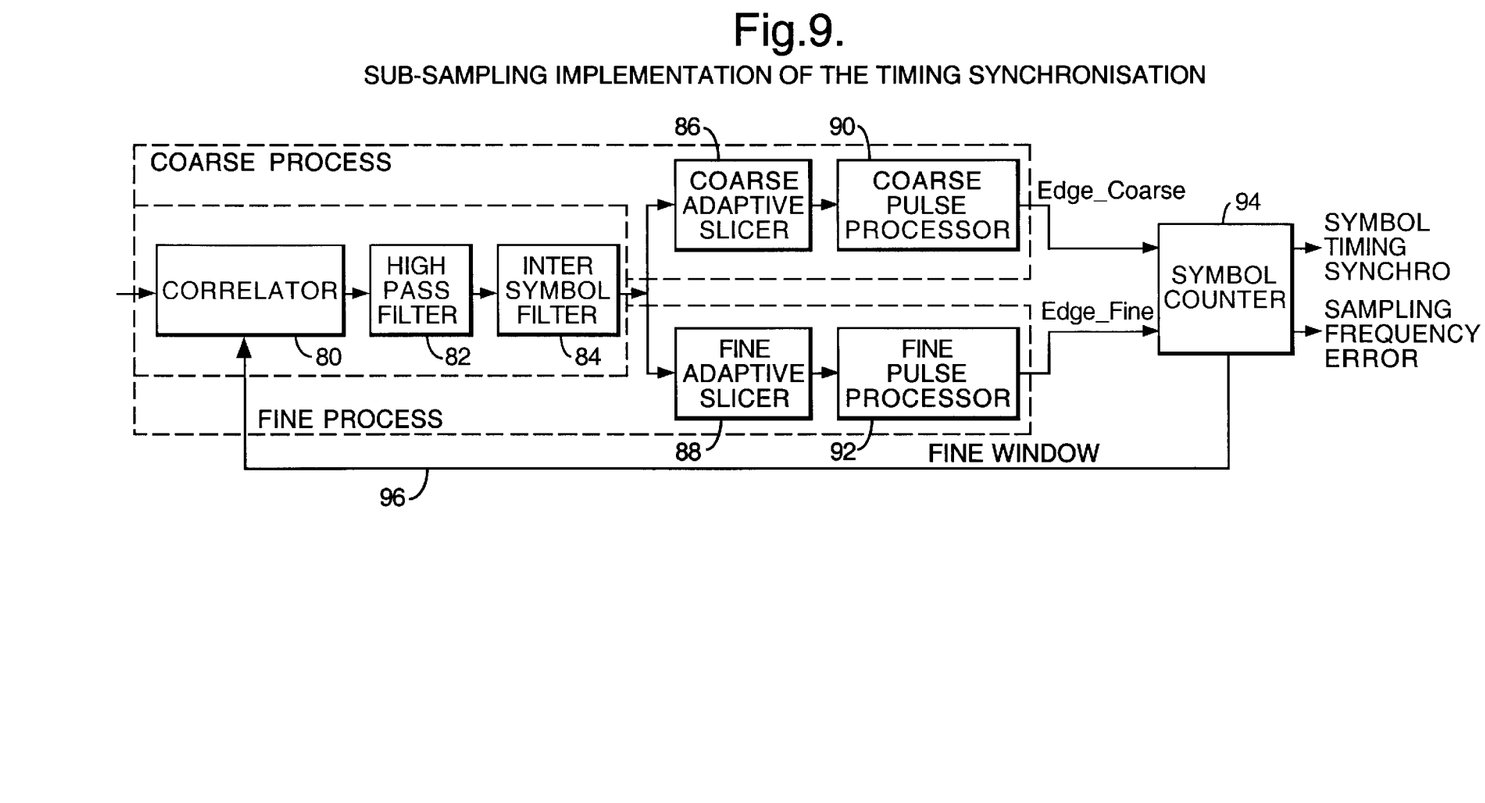
FIG. 9 is a block diagram of a preferred embodiment of timing synchronization apparatus according to the present invention.
Figure 10:
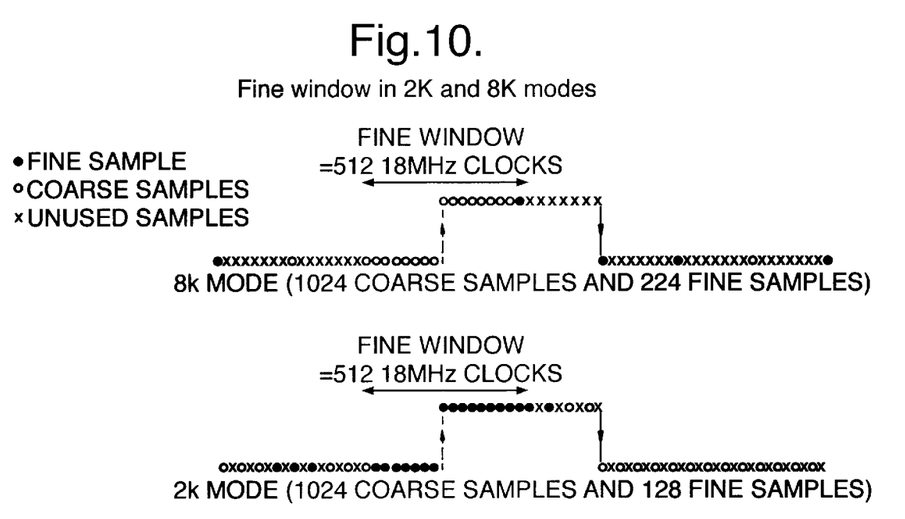
FIG. 10 is a schematic waveform diagram of a fine window generated in the timing synchronization for 2K and 8K modes.

The optimised timing implementation consists of eight major units as shown in FIG. 9. A correlator 80 operating only on coarse and fine samples performs the correlation between the delayed version of the noisy-like OFDM signal and its complex conjugate.

A high pass recursive filter 82 operating on coarse samples only removes the offset cause by the interferer. This is followed by an IIR symbol filter 84 operating over coarse and fine samples which exploits the periodic nature of the waveform to suppress noise and other impairments to produce a rectangular pulse, the duration of which is related to the guard interval.

Then coarse adaptive slicer unit 86 working only on coarse samples and the fine adaptive slicer unit 88 working on all the samples, project the incoming complex input along four axes (real, -real, imaginary, -imaginary), compares the four axis values, choose the larger one and slice it at a predetermined value. The one bit signals from the coarse and fine adaptive slicer units are passed respectively to coarse and fine pulse processor units 90, 92 which check and isolate the desired coarse and fine leading edge of the correlation pulse. Finally, the EDGE_FINE and EDGE_COARSE signals produced respectively by the fine and coarse units are presented to a symbol counter 94. The role of the symbol counter is to obtain both the sampling frequency and symbol timing synchronization. The symbol counter provides a fine window interval on line 96 to correlator 80. Symbol counter 94 provides a start pulse for the FFT processing and the sampling frequency error for VCXO 8 (FIG. 2).

It will be observed that the coarse and fine operations are carried out simultaneously, in parallel. Thus in operation, on startup, the EDGE_COARSE signal will not be stable and hence the window for the fine process will be similarly unstable, with no useful information being provided. As the coarse process settles with more incoming samples, the EDGE_COARSE signal becomes more stable, and the window for the fine process moves less, eventually becoming fixed. As the recursive filtering in the fine process becomes effective, the EDGE_FINE signal will remain stable, even with occasional movement of the fine window, caused by spurious movement of the EDGE_COARSE signal. If however, the EDGE_COARSE signal moves to a stable new position, the EDGE_FINE signal will eventually degrade and the recursive filtering will gradually move the EDGE_FINE signal to a new stable position.

The correlator unit performs the correlation between the delayed version of the noisy-like OFDM signal and its complex conjugate. During the coarse processing, the correlator in 8K mode, considers only one sample over eight received while in 2K mode, one over two complex samples are considered resulting for the two modes to a coarse buffer of 1024 coarse samples.

The correlator unit 80 consists of two logical buffers, a coarse logical buffer and a fine logical buffer that can be implemented with a single port memory of 1248 words of 20 bits (1094 coarse and 224 fine samples).

Figure 11:
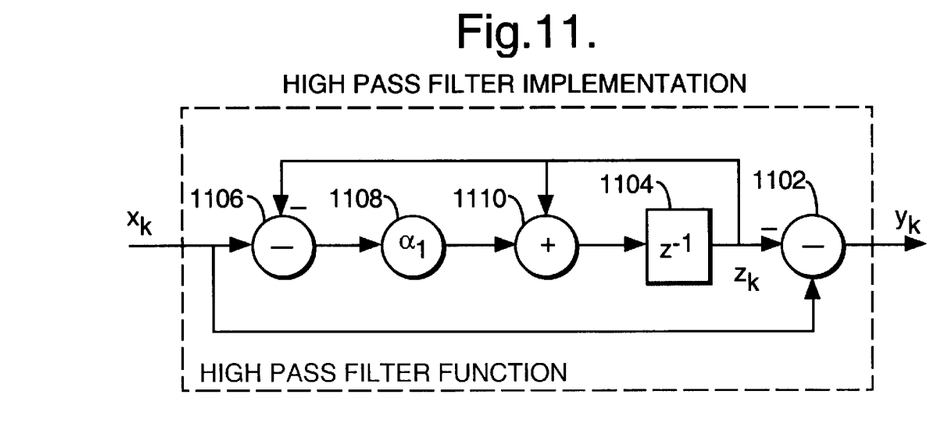
FIG. 11 is a schematic block diagram of a high pass filter used in time synchronization.

After the correlator unit 80, the high pass filter unit 82 consists of an intra symbol recursive low pass filter which extracts the average level of the complex produce signal and a subtractor which subtracts the average level from the complex input signal. This HPF function is working only on coarse samples. Referring to FIG. 11, the high pass filter comprises a subtractor 1102 for subtracting the input signal from an averaged version of the input signal, the averaged value being provided by a delay element 1104 which provides an output both to subtractor unit 1102 and to a further subtractor unit 1106 coupled to receive the input signal and providing a difference value to a constant multiplier $\alpha_1$(1/8192 in 2K mode and 1/32768 in 8K mode) 1108, the scaled version being provided to an adder 1110 where it is added with the output of delayed unit 1104, thereby providing a long term average complex input signal.

The high pass filter unit 82 is followed by the inter symbol ER filter unit 84 which suppress noise to produce a recognisable pulse. This filter works on both coarse and fine samples only and implements the following equation from symbol to symbol for every incoming fine and coarse complex samples:

$$y_k(l+1)=\alpha_2(\chi_k(l+1)-y_k(l))+y_k(l)$$

Where k represents the temporal index and l the symbol number.

Figure 12:
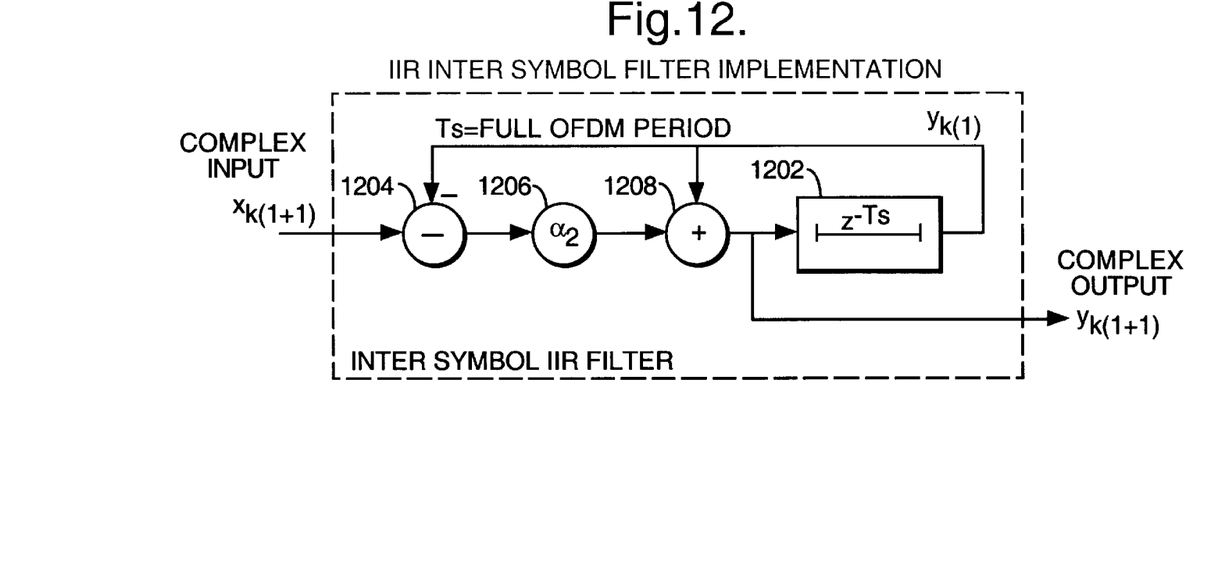
FIG. 12 is a schematic block diagram of an intersymbol filter used in the timing synchronization.

Referring to FIG. 12, the intersymbol IIR filter unit 84 comprises a delay line 1202 having a full one symbol delay, representing the active OFDM symbol pulse and the guard interval. The output of the delay is applied to a subtractor 1204 where it is subtracted from the input signal, the difference version being scaled by a factor $\alpha_2$ the scaled signal being added in an adder 128 to the output from delay unit 1202, the output from the adder being applied to the input of delay unit 1202 and also being provided as an output signal.

The delay line is organized as two logical buffers, a coarse logical buffer and a fine logical buffer. The coarse logical buffer depending on the guard interval should be able to address up to 1280 complex coarse samples while the logical fine buffer is up to 224 complex samples. Each sample are 12 bits real and imaginary parts. For the implementation, the delay line consists in a one single port physical memory of 1504 words of 24 bits (complex samples). Table 1 summarizes the number of complex samples for both logical buffers.

TABLE 1

| Δ | 1/32 | | 1/16 | | 1/8 | | 1/4 | |
|---|---|---|---|---|---|---|---|---|
| mode | 2 K | 8 K | 2 K | 8 K | 2 K | 8 K | 2 K | 8 K |
| Coarse buffer | 1056 | 1056 | 1088 | 1088 | 1152 | 1152 | 1280 | 1280 |
| Fine buffer | 128 | 224 | 128 | 224 | 128 | 224 | 128 | 224 |
| Total buffer | 1184 | 1280 | 1216 | 1312 | 1280 | 1376 | 1408 | 1504 |

After the inter symbol filter 84, the coarse adaptive slicer 86 and pulse processor 90 operate in parallel with the fine adaptive slicer 88 and pulse processor 92 units. Only the coarse units are described below. The fine units are identical but process all samples within a fine window. The coarse adaptive slicing operates as follows.

Referring back to FIG. 6, the shape of the pulse from the filters may not be optimum because there may be local oscillator frequency error in the down-converter. Such an error causes the complex pulse to be rotated from its nominal position on the real axis to another position in the Argand diagram, so that the argument of the pulse can take any value. In addition, the modulus of the pulse can vary, and the shape of the pulse can vary in view of multipath in the propagation. The basis of the method shown in FIG. 6 is that, if the plane of the argument of the symbol pulse is close to the real or imaginary axis, then that signal component represents a good approximation to the signal. Thus, referring to FIG. 13, the input signal is converted to a sign and magnitude value in converter 1302, and the output is applied via a filtering mechanism to registers 1304 storing the magnitude values on the 4 axes. The sign bit from converter 1302 controls switches 1306 to select either the negative or positive part of the axes for application to a subtractor 1308 where the stored value is compared with the input signal, the sign of the comparison being applied to a multiplexer unit 1310. The output of the subtractor 1308 is applied to a scaler 1312 and thence to an adder 1314 where the scaled input signal is added to the stored value, and the updated value or the previous stored value is chosen by multiplexer 1310, in accordance wit the result of the subtraction in unit 1308. A decrementing circuit 1316 is provided which subtracts 1 from the stored magnitude every 512 clock cycles at 10 MHz in 2K mode and every 2,048 clock cycles at 9 MHz in 8K mode. The scaler 1312 scales by a factor ¼.

Figure 13:
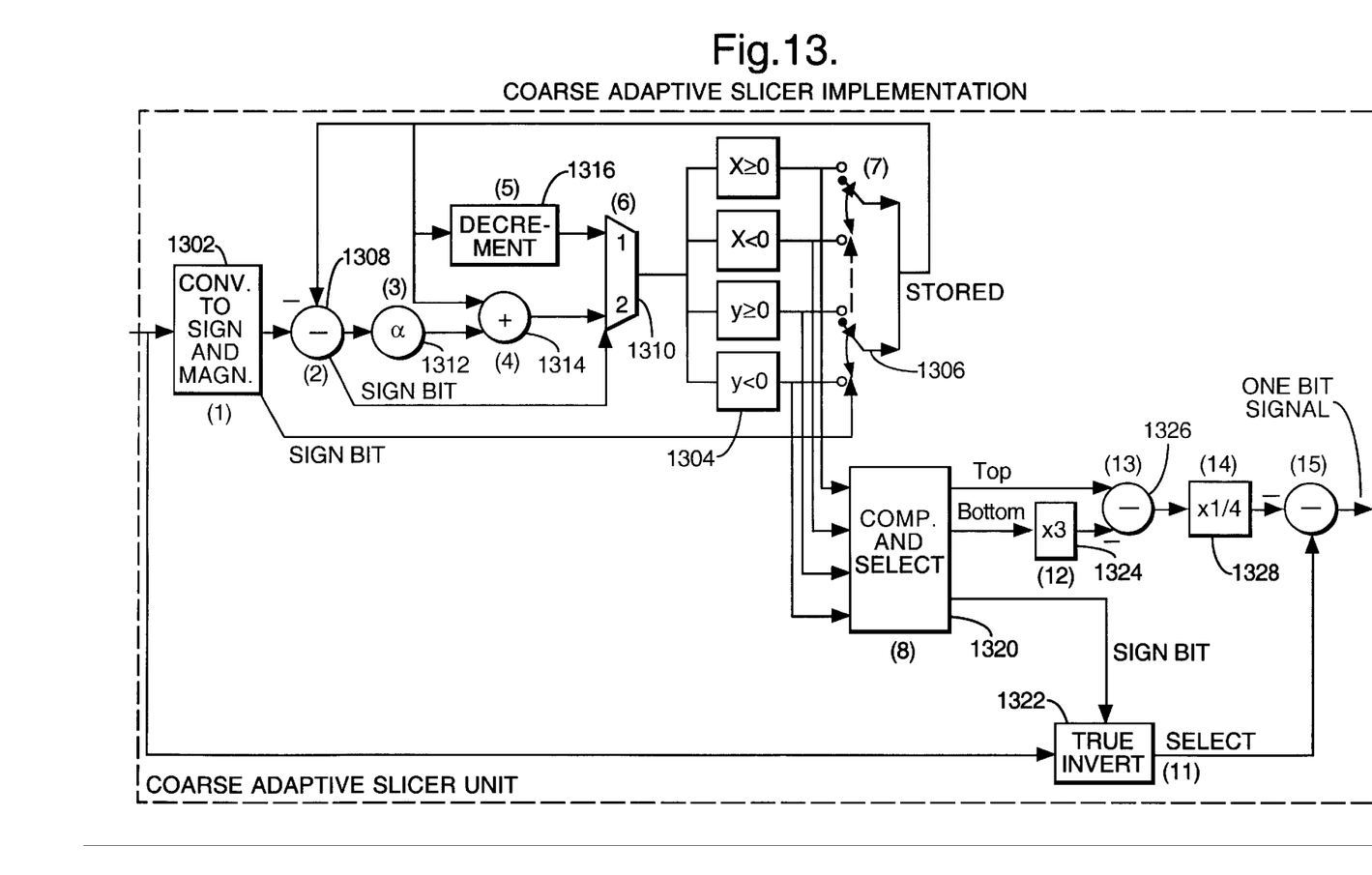
FIG. 13 is a schematic block diagram of a coarse adaptive slicer used in the timing synchronization.

The four stored values representative of the peak for the four axes (X≧0, X<0, Y≧0, Y<0) are compared at 1320 and the greater axis in magnitude (Top) is chosen. This determines whether the real or imaginary component has the greater peak magnitude and controls the selection either of all the real samples from the input if X≧0 or X<0 axes are chosen or all are imaginary otherwise. Also the sign of the greater axis in magnitude is used at 1322 to control the inversion of the selected input samples in such a way that the output of the True/Invert unit always provides a positive rectified value. At the same time, the positive axis (X≧0 or Y≧0) with the greater magnitude (Top) has subtracted three times (12) the value of the axis labelled Bottom this axis corresponding to the opposite direction of the axis Top (units 1324, 1326), the result of the subtraction being divided by 4 at 1328. This result is then subtracted at 1330 from the rectified selected input sample and the sign bit of the subtraction provides a One Bit Signal to the coarse pulse processor unit 90.

Figure 14:
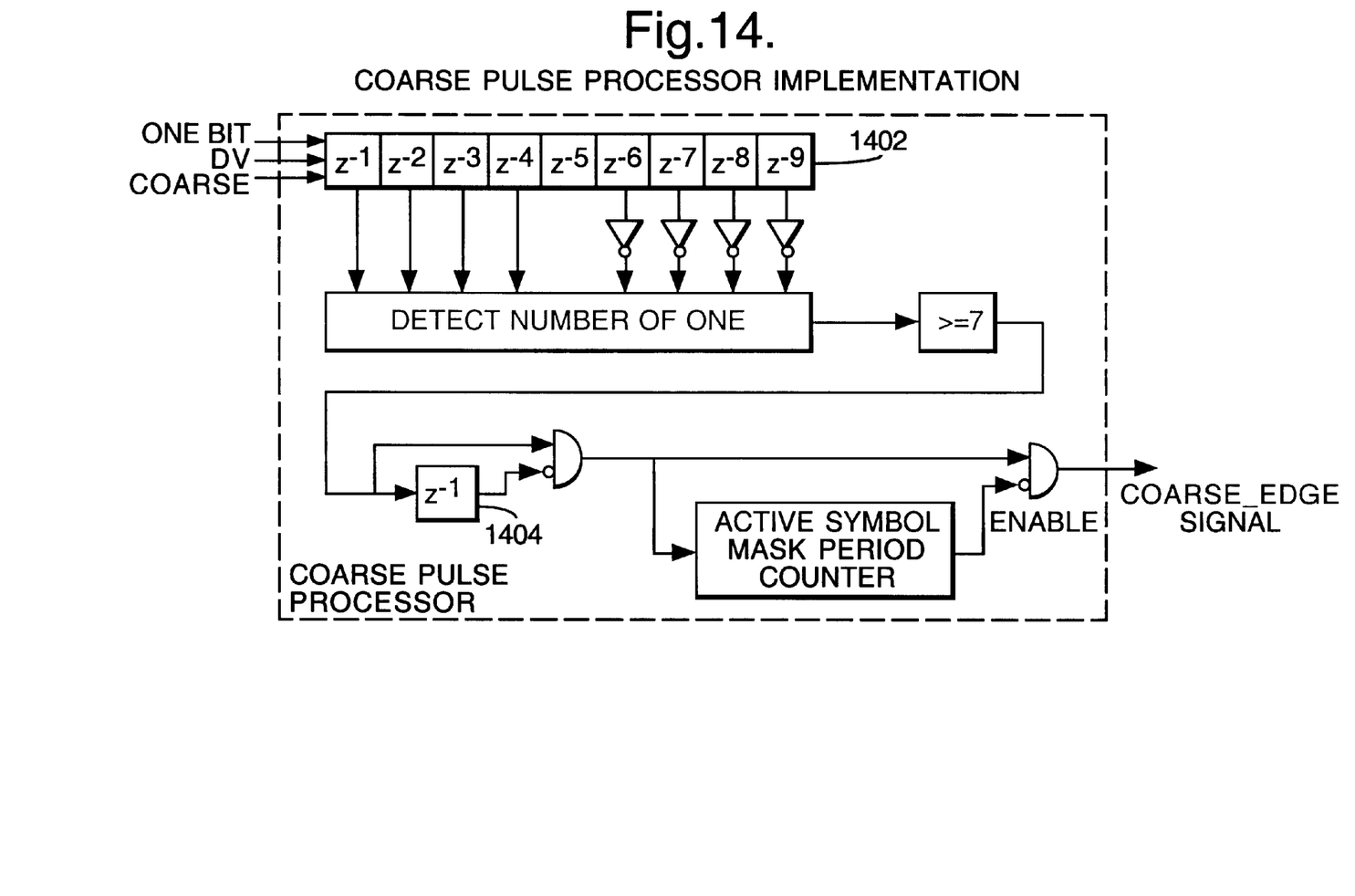
FIG. 14 is a schematic block diagram of a coarse pulse processor used in the timing synchronization.

The coarse pulse processor unit 90 operates only on coarse samples takes the one bit signal coming from the coarse adaptive slicer unit and produces a single short pulse from the rising edge of the symbol pulse as shown in FIG. 14. A majority logic 1402 detects the rising edge of the input pulse, and produces by a monostable 1404, a pulse in the region of the rising edge of the pulse, which is provided as an output single clock pulse. The coarse pulse processor logic also prevents any further pulses from being conveyed to the output until the region of the next symbol pulse has been reached. To do so, an Active Period Symbol counter 1406 is free-incrementing up to its maximum. Only when the free-running counter has reached its maximum, then a pulse from monostable 1404 is permitted, presented to the output (the Coarse_Edge signal). This single pulse also reinitiates the counting process of the free-running counter. When the maximum is not reached, any new incoming single pulse is ignored, thus preventing single pulses to be closer than the active period TA.

Figure 15:
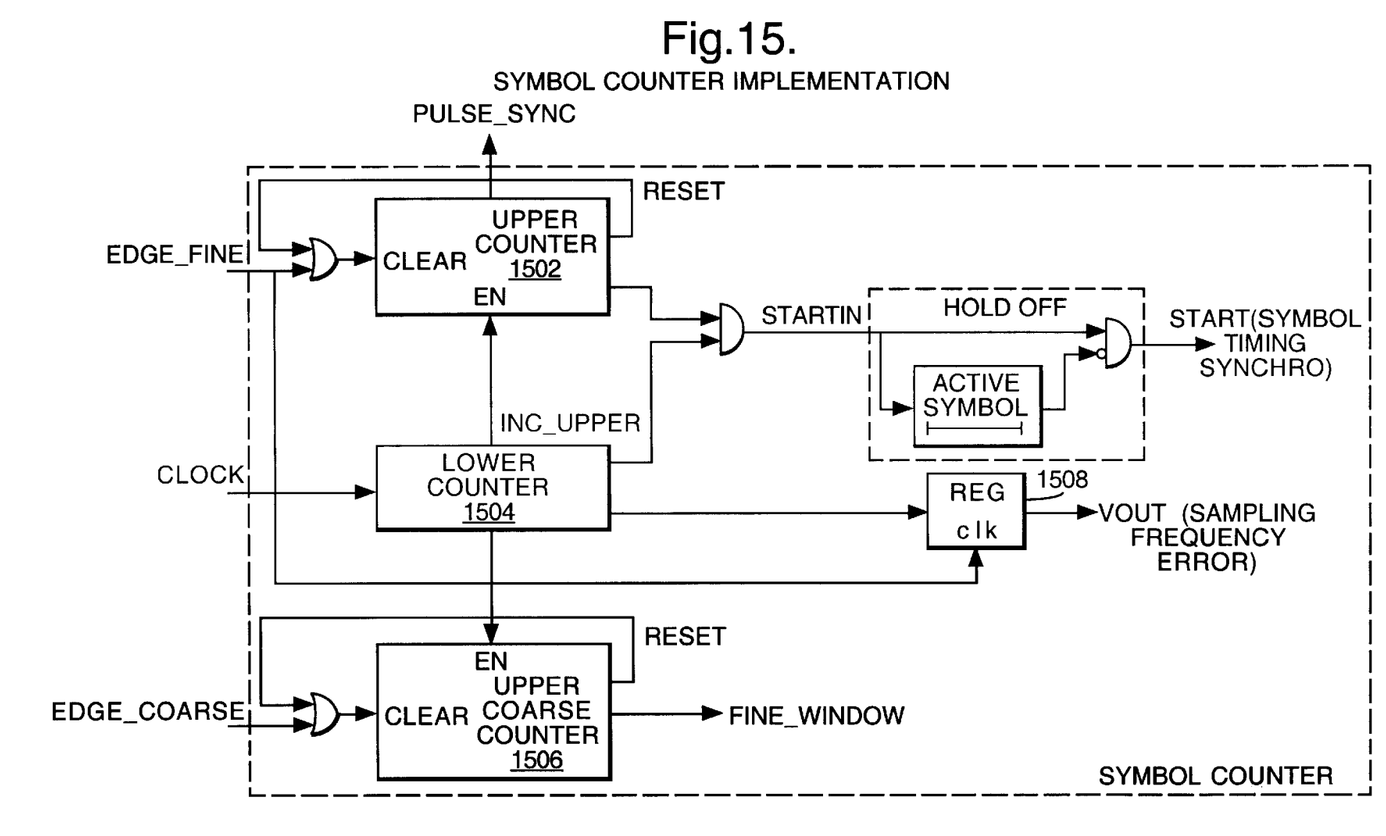
FIG. 15 is a schematic block diagram of a symbol counter used in the timing synchronization.

The symbol counter unit 94 receives the Edge_Fine, and Edge_Coarse signals coming respectively from the fine and coarse pulse processor units 90, 92. The symbol counter unit 94 comprises an upper fine counter 1502 for receiving Edge_Fine signal, a lower counter 1504 receiving a clock signal, and an upper coarse counter 1506 receiving an Edge_Coarse signal. The lower counter 1504, when it completes a whole number of count cycles in a symbol period, provides an enable signal so that the coarse and fine stages advance by one each time the lower counter 1504 completes a count cycle. In 2k mode, the lower counter counts over the range 0 to 127 while in 8K mode over the range 0 to 511. Lower counter 1504 simply counts the incoming 18 MHz clock pulse and is never reset. At every Edge_Fine pulse the lower counter value is stored in a register 1508. The output of this register Vout is interpreted as a signal for controlling the frequency of the control oscillator 8 (FIG. 3).

The upper fine counter 1502 counts from 0 to 32, 0 to 33, 0 to 35 or 0 to 39 depending on whether the guard interval is ¹⁄₃₂, ¹⁄₁₆, ⅛ or ¼. This upper fine counter is reset either by the Edge_Fine signal or by the upper count completing its count range.

When in 2k mode the upper fine stage value is 2, 4, 8, or 16 for a guard interval of ¹⁄₃₂, ¹⁄₁₆, ⅛ or ¼ then the starting signal START is asserted high otherwise low and provided to FFT unit 24. In 8K mode only the upper fine stage value is 2, 4, 8, or 16 for a guard interval of ¹⁄₃₂, ¹⁄₁₆, ⅛ or ¼ then the starting signal is asserted high. A Hold Off logic 1510 just prevents two consecutive START signals to be present within a time period less than an active period.

As with the upper fine counter 1502, the upper coarse counter 1506 counts from 0 to 32, 0 to 33 or 0 to 39 depending on whether the guard interval is ¹⁄₃₂, ¹⁄₆, ⅛ or ¼. This upper counter is reset either when it is completing its count range or an Edge Coarse event occurs. The fine window is generated from the upper coarse counter values and is specified as in Table 2.

TABLE 2

| Δ | ¹⁄₃₂ | ¹⁄₁₆ | ⅛ | ¼ |
|---|---|---|---|---|
| 2K mode | 30 to 0 | 31 to 0 | 33 to 0 | 37 to 0 |
| 8K mode | 0 | 0 | 0 | 0 |

Features of the invention, at least in the preferred embodiment:

1) this sub-sampling version of the timing synchronization leads to 61K bits of storage elements instead of 410K bits with the full resolution version of the timing synchronization.
2) to have two processes working in parallel, a coarse process and a fine process
3) use only a sub-set of incoming data by sub-sampling to determine a small region of interest.
4) to have in this small region of interest a full resolution to keep good performance.

What is claimed is:

1. An apparatus for demodulating digital video broadcast signals comprising data modulated on a multiplicity of spaced carrier frequencies, comprising:

conversion means for converting a down-converted version of the broadcast signal to a series of digital samples in complex format;

transform means for analyzing the digital sample values to provide a series of data symbol values for each carrier frequency;

signal processing means for receiving the data symbol values and providing an output for decoding; and timing synchronization means for synchronizing the transform means with symbol periods of the broadcast signal, including correlation means for receiving the digital sample values and comprising delay means having a time period delay equal to the active symbol period, and multiplier means for receiving the digital sample values and a version thereof delayed by said delay means, to form a complex product signal, and means for processing the complex product signal to derive timing synchronization pulses, wherein the timing synchronization means comprises a coarse synchronization means employing a subset of the digital sample values for providing a coarse timing synchronization, and a fine synchronization means for providing a fine timing synchronization within a time period determined by the coarse synchronization means.

2. An apparatus according to claim 1, wherein the coarse synchronization means includes said correlation means arranged to operate only on a subset of said digital sample values spaced apart a predetermined amount.

3. An apparatus according to claim 2, wherein said subset comprises values spaced apart every eight samples.

4. An apparatus according to claim 3, wherein the coarse synchronization means comprises coarse adaptive slicing means for determining the leading edge of the pulse of the complex product generated by the correlation means.

5. An apparatus according to claim 4, including a symbol counter for providing a window signal (fine_window) to said fine synchronization means, said fine synchronization means including a fine correlation means for determining said complex product signal based on all the data sample values within said time period.

6. An apparatus according to claim 5, wherein both the coarse and fine synchronization means include a respective inter symbol filter for removing a DC component in the product signal, and include a buffer for storing delayed sample values.

7. An apparatus according to claim 6, wherein the fine synchronization means includes a fine adaptive slicing means for determining the leading edge of a pulse representing a data sample value.

8. An apparatus according to claim 5, wherein the symbol counter provides a symbol timing synchronization pulse train, and a sampling frequency error to control an external oscillator.

9. An apparatus according to claim 8, wherein the coarse synchronization means and the fine synchronization means operate simultaneously and in parallel.

10. An apparatus according to claim 8, wherein the symbol counter includes a first counter coupled to receive clock signals, and coupled for incrementing a fine counter and a coarse counter, the fine counter being arranged to be reset by the fine timing synchronization and the coarse counter being arranged to be reset by the coarse timing synchronization.

11. An apparatus according to claim 5, wherein the fine correlation means and the coarse correlation means employ a common delay means and multiplier means, and have separate buffer means for storing product values.

12. An apparatus according to claim 5, wherein the symbol counter includes a first counter coupled to receive clock signals, and coupled for incrementing a fine counter and a coarse counter, the fine counter being arranged to be reset by the fine timing synchronization and the coarse counter being arranged to be reset by the coarse timing synchronization.

13. An apparatus according to claim 2, wherein the fine correlation means and the coarse correlation means employ a common delay means and multiplier means, and have separate buffer means for storing product values.

14. An apparatus according to claim 1, wherein the coarse synchronization means comprises coarse adaptive slicing means for determining the leading edge of the pulse of the complex product generated by the correlation means.

15. An apparatus according to claim 1, wherein both the coarse and fine synchronization means include a respective inter symbol filter for removing a DC component in the product signal, and include a buffer for storing delayed sample values.

16. An apparatus according to claim 1, wherein the coarse synchronization means and the fine synchronization means operate simultaneously and in parallel.

17. A method for demodulating digital video broadcast signals comprising data modulated on a multiplicity of spaced carrier frequencies, comprising:

converting a down-converted version of the broadcast signal to a series of digital samples in complex format;

transforming the digital samples to provide a series of data symbol values for each carrier frequency;

signal processing the data symbol values to provide an output for decoding; and time synchronizing the transforming step with symbol periods of the broadcast signal, including correlating the data symbol values with data symbol values delayed by a time period delay equal to an active symbol period, to form a complex product sample signal, and processing the complex product signal;

wherein the timing synchronization comprises a coarse synchronization step employing a subset of the data sample values for providing a coarse timing synchronization, and a fine synchronization step for providing a fine synchronization employing the data sample values within a time period determined by the coarse synchronization step.

18. A method as claimed in claim 17, including carrying out said coarse synchronization step and said fine synchronization step simultaneously and in parallel.

* * * * *